United States Patent
Rosenbaum et al.

(10) Patent No.: US 6,168,862 B1
(45) Date of Patent: *Jan. 2, 2001

(54) MULTI-LAYERED POLYMER BASED THIN FILM STRUCTURE FOR MEDICAL GRADE PRODUCTS

(75) Inventors: Larry A. Rosenbaum, Gurnee; William Anderson, Hoffman Estates; Lecon Woo, Libertyville; Dean Laurin, Round Lake Beach; Angeles Lillian Buan, Crystal Lake; Michael T. K. Ling; Yuan Pang Samuel Ding, both of Vernon Hills; Denise S. Hayward, Mundelein; Joseph P. Hoppesch, McHenry, all of IL (US); Gregg Nebgen, Burlington, WI (US); Stanley Westphal, East Dundee, IL (US)

(73) Assignee: Baxter International Inc., Deerfield, IL (US)

( * ) Notice: Under 35 U.S.C. 154(b), the term of this patent shall be extended for 0 days.

This patent is subject to a terminal disclaimer.

(21) Appl. No.: 09/334,284

(22) Filed: Jun. 16, 1999

Related U.S. Application Data

(63) Continuation of application No. 08/153,602, filed on Nov. 16, 1993, now Pat. No. 5,998,019.

(51) Int. Cl.⁷ ............................ B32B 27/08; B32B 27/30; B32B 27/32; B32B 27/34

(52) U.S. Cl. ...................... 428/345; 428/36.6; 428/36.7; 428/355 EN; 428/355 BL; 428/355 AC; 428/355 N; 428/475.8; 428/376.1; 428/476.3; 428/476.9; 428/515; 428/516; 428/519; 428/520; 428/522; 428/523; 525/66; 525/88; 525/92 R; 525/92 B; 525/93; 525/96; 525/178; 525/185; 525/191; 525/222; 525/240; 525/241

(58) Field of Search ................... 428/36.6, 36.7, 428/345, 355 R, 475.8, 476.8, 476.3, 476.9, 515, 520, 516, 523, 519, 522, 355 EN, 355 BL, 355 AC, 355 N; 525/88, 66, 92 R, 92 B, 93, 95, 96, 178, 185, 191, 222, 240, 241

(56) References Cited

U.S. PATENT DOCUMENTS

| | | |
|---|---|---|
| 2,705,223 | 3/1955 | Renfrew et al. . |
| 3,255,923 | 6/1966 | Soto . |
| 3,375,300 | 3/1968 | Ropp . |
| 3,772,136 | 11/1973 | Workman . |
| 3,912,843 | 10/1975 | Brazier . |

(List continued on next page.)

FOREIGN PATENT DOCUMENTS

| | | |
|---|---|---|
| 41 42 271 A1 | 6/1993 | (DE) . |
| 92897 | 2/1983 | (EP) . |
| 446505 A1 | 6/1993 | (EP) . |
| 2688511 | 9/1993 | (FR) . |
| 2 177 974A | 2/1987 | (GB) . |
| WO83/00158 | 1/1983 | (WO) . |
| WO86/07010 | 12/1986 | (WO) . |
| WO93/23093 | 11/1993 | (WO) . |

Primary Examiner—Vivian Chen
(74) Attorney, Agent, or Firm—Mark J. Buonaiuto; Joseph A. Fuchs

(57) ABSTRACT

A multiple layer structure comprising a skin layer composed of a polypropylene copolymer with styrene ethylene-butene styrene block copolymer within a range of 0–20% by weight skin layer, and, a radio frequency ("RF") susceptible layer adhered to the skin layer. The RF layer has a first component of a propylene based polymer, a second component of a nonpropylene polyolefin, a third component of a radio frequency susceptible polymer, and a fourth component of a polymeric compatibilizing agent.

8 Claims, 4 Drawing Sheets

U.S. PATENT DOCUMENTS

| | | |
|---|---|---|
| 3,937,758 | 2/1976 | Castagna . |
| 3,995,084 | 11/1976 | Berger et al. . |
| 4,041,103 | 8/1977 | Davison et al. . |
| 4,058,647 | 11/1977 | Inoue et al. . |
| 4,087,587 | 5/1978 | Shida et al. . |
| 4,087,588 | 5/1978 | Shida et al. . |
| 4,095,012 | 6/1978 | Schirmer . |
| 4,147,827 | 4/1979 | Breidt, Jr. et al. . |
| 4,230,830 | 10/1980 | Tanny et al. . |
| 4,233,367 | 11/1980 | Ticknor et al. . |
| 4,311,807 | 1/1982 | McCullough et al. . |
| 4,322,465 | 3/1982 | Webster . |
| 4,322,480 | 3/1982 | Tuller et al. . |
| 4,327,726 | 5/1982 | Kwong . |
| 4,332,655 | 6/1982 | Berejka . |
| 4,387,184 | 6/1983 | Coquard et al. . |
| 4,405,667 | 9/1983 | Christensen et al. . |
| 4,407,877 | 10/1983 | Rasmussen . |
| 4,407,888 | 10/1983 | Crofts . |
| 4,417,753 | 11/1983 | Bacebowski et al. . |
| 4,429,076 | 1/1984 | Saito et al. . |
| 4,479,989 | 10/1984 | Mahal . |
| 4,521,437 | 6/1985 | Storms . |
| 4,548,348 | 10/1985 | Clements . |
| 4,562,118 | 12/1985 | Maruhashi et al. . |
| 4,568,723 | 2/1986 | Lu . |
| 4,588,648 | 5/1986 | Krueger et al. . |
| 4,599,276 | 7/1986 | Martini . |
| 4,627,844 | 12/1986 | Schmitt . |
| 4,636,412 | 1/1987 | Field . |
| 4,640,870 | 2/1987 | Akazawa et al. . |
| 4,643,926 | 2/1987 | Mueller . |
| 4,686,125 | 8/1987 | Johnston et al. . |
| 4,692,361 | 9/1987 | Johnson et al. . |
| 4,707,389 | 11/1987 | Ward . |
| 4,724,028 | 2/1988 | Zabielski et al. . |
| 4,726,997 | 2/1988 | Mueller et al. . |
| 4,732,795 | 3/1988 | Ohya et al. . |
| 4,734,327 | 3/1988 | Vicik . |
| 4,735,855 | 4/1988 | Wofford et al. . |
| 4,740,582 | 4/1988 | Coquard et al. . |
| 4,753,222 | 6/1988 | Morishita . |
| 4,760,114 | 7/1988 | Haaf et al. . |
| 4,764,404 | 8/1988 | Genske et al. . |
| 4,767,651 | 8/1988 | Starczewski et al. . |
| 4,772,497 | 9/1988 | Maasola . |
| 4,778,697 | 10/1988 | Genske et al. . |
| 4,792,488 | 12/1988 | Schirmer . |
| 4,795,782 | 1/1989 | Lutz et al. . |
| 4,800,129 | 1/1989 | Deak . |
| 4,803,102 | 2/1989 | Raniere et al. . |
| 4,834,755 | 5/1989 | Silvestrini et al. . |
| 4,855,356 | 8/1989 | Holub et al. . |
| 4,856,259 | 8/1989 | Woo et al. . |
| 4,856,260 | 8/1989 | Woo et al. . |
| 4,863,996 | 9/1989 | Nakazima et al. . |
| 4,871,799 | 10/1989 | Kobayashi et al. . |
| 4,873,287 | 10/1989 | Sauers et al. . |
| 4,877,682 | 10/1989 | Raniere et al. . |
| 4,885,119 | 12/1989 | Mueller et al. . |
| 4,910,085 | 3/1990 | Gogolewski et al. . |
| 4,923,470 | 5/1990 | Dumican . |
| 4,929,479 | 5/1990 | Shishido et al. . |
| 4,957,966 | 9/1990 | Nishio et al. . |
| 4,957,967 | 9/1990 | Mizuno et al. . |
| 4,966,795 | 10/1990 | Genske et al. . |
| 4,977,213 | 12/1990 | Giroud-Abel et al. . |
| 4,996,054 | 2/1991 | Pietsch et al. . |
| 4,999,254 | * 3/1991 | Ofstein ................................ 428/518 |
| 5,006,601 | 4/1991 | Lutz et al. . |
| 5,017,652 | 5/1991 | Abe et al. . |
| 5,034,457 | 7/1991 | Serini et al. . |
| 5,034,458 | 7/1991 | Serini et al. . |
| 5,053,457 | 10/1991 | Lee . |
| 5,071,686 | 12/1991 | Genske et al. . |
| 5,071,911 | 12/1991 | Furuta et al. . |
| 5,071,912 | 12/1991 | Furuta et al. . |
| 5,075,376 | 12/1991 | Furuta et al. . |
| 5,079,295 | 1/1992 | Furuta et al. . |
| 5,085,649 | 2/1992 | Flynn . |
| 5,093,164 | 3/1992 | Bauer et al. . |
| 5,093,194 | 3/1992 | Touhsaent et al. . |
| 5,094,921 | 3/1992 | Itamura et al. . |
| 5,108,844 | 4/1992 | Blemberg et al. . |
| 5,110,642 | 5/1992 | Genske . |
| 5,116,906 | 5/1992 | Mizuno et al. . |
| 5,129,894 | 7/1992 | Sommermeyer et al. . |
| 5,132,363 | 7/1992 | Furuta et al. . |
| 5,135,785 | * 8/1992 | Millon ................................ 428/35.2 |
| 5,145,731 | 9/1992 | Lund et al. . |
| 5,154,979 | 10/1992 | Kerschbaumer et al. . |
| 5,159,004 | 10/1992 | Furuta et al. . |
| 5,164,267 | 11/1992 | D'Heur et al. . |
| 5,176,634 | 1/1993 | Smith et al. . |
| 5,176,956 | 1/1993 | Jevne et al. . |
| 5,183,706 | 2/1993 | Bekele . |
| 5,185,189 | 2/1993 | Stenger et al. . |
| 5,189,091 | 2/1993 | Laughner . |
| 5,194,316 | 3/1993 | Horner et al. . |
| 5,196,254 | 3/1993 | Akiyama . |
| 5,206,290 | 4/1993 | Mizuno et al. . |
| 5,212,238 | 5/1993 | Schelbelhoffer et al. . |
| 5,218,048 | 6/1993 | Abe et al. . |
| 5,230,934 | 7/1993 | Sakano et al. . |
| 5,230,935 | 7/1993 | Delimoy et al. . |
| 5,238,997 | 8/1993 | Bauer et al. . |
| 5,244,971 | 9/1993 | Dekoninck . |
| 5,258,230 | 11/1993 | LaFleur et al. . |
| 5,278,231 | 1/1994 | Chundury . |
| 5,288,799 | 2/1994 | Schmid et al. . |
| 5,290,856 | 3/1994 | Okamoto et al. . |
| 5,306,542 | 4/1994 | Bayer . |
| 5,312,867 | 5/1994 | Mitsuno et al. . |
| 5,317,059 | 5/1994 | Chundury et al. . |
| 5,342,886 | 8/1994 | Glotin et al. . |
| 5,348,794 | 9/1994 | Takahashi et al. . |
| 5,356,676 | 10/1994 | von Widdern et al. . |
| 5,371,141 | 12/1994 | Gelles et al. . |
| 5,378,543 | 1/1995 | Murata et al. . |
| 5,378,800 | 1/1995 | Mok et al. . |
| 5,387,645 | 2/1995 | Montag et al. . |
| 5,686,527 | * 11/1997 | Laurin et al. ........................ 525/66 |
| 5,849,843 | * 12/1998 | Laurin et al. ........................ 525/66 |
| 5,993,949 | * 11/1999 | Rosenbaum et al. ............... 428/213 |
| 5,998,019 | * 12/1999 | Rosenbaum et al. ............... 428/345 |

\* cited by examiner

MULTI-LAYERED POLYMER BASED THIN FILM STRUCTURE FOR MEDICAL GRADE PRODUCTS

CONTINUATION INFORMATION

This application is a continuation of application Ser. No. 08/153,602, filed Nov. 16, 1993, U.S. Pat. No. 5,998,019, which is incorporated by reference and made a part hereof.

DESCRIPTION

1. Technical Field

The present invention relates generally to materials for making medical grade products and more specifically to a thin film product which may be used to manufacture articles such as plastic containers and medical tubing.

1. Background Prior Art

In the medical field, where beneficial agents are collected, processed and stored in containers, transported, and ultimately delivered through tubes by infusion to patients to achieve therapeutic effects, materials which are used to fabricate the containers must have a unique combination of properties. For example, in order to visually inspect solutions for particulate contaminants, the container must be optically transparent. To infuse a solution from a container by collapsing the container walls, without introducing air into the container, the material which forms the walls must be sufficiently flexible. The material must be functional over a wide range of temperatures. The material must function at low temperatures by maintaining its flexibility and toughness because some solutions, for example, certain premixed drug solutions are stored and transported in containers at temperatures such as −25 to −30° C. to minimize the drug degradation. The material must also be functional at high temperatures to withstand the heat of sterilization; a process which most medical packages and nutritional products are subjected to prior to shipment. The sterilization process usually includes exposing the container to steam at temperatures typically 121° C. and at elevated pressures. Thus, the material needs to withstand the temperature and pressures without significant distortions ("heat distortion resistance").

For ease of manufacture into useful articles, it is desirable that the material be sealable using radio frequency ("RF") generally at about 27.12 MHz. Therefore, the material should possess sufficient dielectric loss properties to convert the RF energy to thermal energy.

A further requirement is to minimize the environmental impact upon the disposal of the article fabricated from the material after its intended use. For those articles that are disposed of in landfills, it is desirable to use as little material as possible and avoid the incorporation of low molecular weight leachable components to construct the article. Thus, the material should be light weight and have good mechanical strength. Further benefits are realized by using a material which may be recycled by thermoplastically reprocessing the post-consumer article into other useful articles.

For those containers which are disposed of through incineration, it is necessary to use a material which helps to eliminate the dangers of biological hazards, and to minimize or eliminate entirely the formation of inorganic acids which are environmentally harmful, irritating, and corrosive, or other products which are harmful, irritating, or otherwise objectionable upon incineration.

It is also desirable that the material be free from or have a low content of low molecular weight additives such as plasticizers, stabilizers and the like which could be released into the medications or biological fluids or tissues thereby causing danger to patients using such devices or are contaminating such substances being stored or processed in such devices. For containers which hold solutions for transfusion, such contamination could make its way into the transfusion pathway and into the patient causing injury or death to the patient.

Traditional flexible polyvinyl chloride materials meets a number of, and in some cases, most of the above-mentioned requirements. Polyvinyl chloride ("PVC") also offers the distinct advantage of being one of the most cost effective materials for constructing devices which meet the above requirements. However, PVC may generate objectionable amounts of hydrogen chloride (or hydrochloric acid when contacted with water) upon incineration, causing corrosion of the incinerator. PVC sometimes contains plasticizers which may leach into drugs or biological fluids or tissues that come in contact with PVC formulations. Thus, many materials have been devised to replace PVC. However, most alternate materials are too expensive to implement and still do not meet all of the above requirements.

There have been many attempts to develop a film material to replace PVC, but most attempts have been unsuccessful for one reason or another. For example, in U.S. Pat. No. 4,966,795 which discloses multilayer film compositions capable of withstanding the steam sterilization, cannot be welded by radio frequency dielectric heating thus cannot be assembled by this rapid, low costs, reliable and practical process. European Application No. EP 0 310 143 A1 discloses multilayer films that meet most of the requirements, and can be RF welded. However, components of the disclosed film are cross-linked by radiation and, therefore, cannot be recycled by the standard thermoplastic processing methods. In addition, due to the irradiation step, appreciable amounts of acetic acid is liberated and trapped in the material. Upon steam sterilization, the acetic acid migrates into the packaging contents as a contaminant and by altering the pH of the contents acts as a potential chemical reactant to the contents or as a catalyst to the degradation of the contents.

The main objective of the present invention is the creation of thermoplastic materials which are, overall, superior to those materials, of which we are aware, which have been heretofore known to the art or have been commercially used or marketed. The properties of such materials includes flexibility, extensibility, and strain recoverability, not just at room temperatures, but through a wide range of ambient and refrigerated temperatures. The material should be sufficiently optically transparent for visual inspection, and steam sterilizable at temperatures up to 121° C. The material should be capable of being subjected to significant strains without exhibiting strain whitening, which can indicate a physical and a cosmetic defect. A further objective is that the material be capable of assembly by the RF methods. Another objective is that the material be substantially free of low molecular weight leachable additives, and be capable of safe disposal by incineration without the generation of significant amounts of corrosive inorganic acids. Another objective is that the material be recyclable by standard thermoplastic processing methods after use. It is also desirable that the material incorporate reground scrap material recovered during the manufacturing process to save material costs and reduce manufacturing waste. Finally, the material should serve as a cost effective alternative to various PVC formulations currently being used for medical devices.

When more than one polymer is blended to form an alloying composition, it is difficult to achieve all of the above objectives simultaneously. For example, in most instances alloy composition may scatter light; thus, they fail to meet the optical clarity objective. The light scattering intensity (measured by haze) depends on the domain size of components in the micrometer ($\mu$) range, and the proximity of the refractive indices of the components. As a general rule, the selection of components that can be satisfactorily processed into very small domain sizes, and yet with a minimum of refractive index mismatches, is a difficult task.

The present invention is provided to solve these and other problems.

SUMMARY OF THE INVENTION

In accordance with the present invention certain multiple layer polymer based structures are disclosed. The films may be fabricated into medical grade articles such as containers for storing medical solutions or blood products, blood bags, and related items, or other products constructed from multi-layered structures.

It is an object of the present invention to prepare a multi-layered film having the following physical properties: (1) a mechanical modulus less than 40,000 psi and more preferably less than 25,000 psi when measured in accordance with ASTM D-20 882, (2) a greater than or equal to 70%, and more preferably greater than or equal to 75%, recovery in length after an initial deformation of 20%, (3) and optical haze of less than 30%, and more preferably less than 15%, when measured for a composition 9 mils thick and in accordance to ASTM D-1003, (4) the loss tangent measured at 1 Hz at processing temperatures is greater than 1.0, and more preferably greater than 2.0, (5) the content of elemental halogens is less than 0.1%, and more preferably less than 0.01%, (6) the low molecular weight water soluble fraction is less than 0.1%, and more preferably less than 0.005%, (7) the maximum dielectric loss between 1 and 60 MHz and between the temperature range of 25–250° C. is greater than or equal to 0.05 and more preferably greater than or equal to 0.1, (8) autoclave resistance measured by sample creep at 121° C. under 27 psi loading is less than or equal to 60% and more preferably less than or equal to 20%, and (9) there is no strain whitening after being strained at moderate speeds of about 20 inches (50 cm) per minute at about 100% elongation and the presence of strain whitening is noted or the lack thereof. The multiple layer structure of the present invention comprises a skin layer preferably composed of a polypropylene copolymers with styrene and hydrocarbon block copolymers. More preferably a propylene copolymer with ethylene-butene styrene ("SEBS") within a range of 0–20% by weight of the skin layer. The structure further includes a radio frequency ("RF") susceptible layer adhered to the skin layer. The RF layer is composed of a first component of a polypropylene polymer, a second component of a non-propylene polyolefin (one that does not contain propylene repeating units), a third component of a radio frequency susceptible polymer, and a fourth component of a polymeric compatibilizing agent. In alternate embodiments, additional layers such as core, scrap, and barrier layers are added to the skin and RF layers to confer additional or enhanced functionality of the resultant film structure.

The RF layer is the subject of the concurrently filed U.S. Pat. No. 5,849,843 which is incorporated herein by reference. The multi-layered film structure of the present invention offers additional features that the compositions of the RF layer alone do not provide. The additional features of the multi-layer film include an exterior surface gloss and reduced tackiness to the outside surface of the film structure. Additionally, the multilayered film structure has improved vapor barrier properties, greater strength and optical clarity, and is cleaner or has reduced tendency to migrate into the contents of the container.

The core layer, which is interposed between the skin layer and the RF layer consists of three components. Preferably, the first component is polypropylene which constitutes about 40% of the core layer, the second component is an ultra low density polyethylene ("ULDPE") which constitutes about 50% by weight of the core layer, and the third component is styrene-hydrocarbon block copolymer and more preferably an SEBS block copolymer which constitutes about 10% by weight of the core layer. The entire core layer should be 4.0 mils thick.

It is also desirable, for economic reasons among others, to incorporate reground scrap material recovered during the processing of the film material back into the composition of a film structure. This can lead to using significant amount of scrap material as a weight percent of the entire layer structure, thereby substantially decreasing the costs of the film product. The reground scrap may be incorporated into the above-described structure either as an additional discrete layer located somewhere between the skin layer and the RF layer or may be blended into the core layer as an additional component. In either case, significant resources are saved by reprocessing the scrap material.

To increase gas barrier properties of the structure, it is desirable to incorporate a barrier layer between the skin layer and the RF layer. The barrier layer may be attached to surrounding layers using adhesive tie layers. The barrier layer may be selected from ethylene vinyl alcohols such as that sold under the name Evalca (Evalca Co.), highly glass or crystalline polyamide such as Sclar PA® (Dupont Chemical Co.), high nitrile content acrylonitrile copolymers such as those sold under the tradename Barex® sold by British Petroleum.

Films having the aforesaid structure and compositions have been found to be flexible, optically clear, non-strain whitening, and steam and radiation sterilizable. Additionally, the films are compatible with medical applications because the components which constitute the film have a minimal extractability to the fluids and contents that the composition come in contact with. Further, the films are environmentally sound in that they do not generate harmful degradants upon incineration. Finally, the films provide a cost effective alternative to PVC.

Additional features and advantages of the present invention are described in, and will be apparent from, the drawing and the detailed description of the presently preferred embodiments.

DETAILED DESCRIPTION

While this invention is susceptible of embodiments in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

According to the present invention, multiple layered film structures are provided which meet the requirements set forth above.

Figure 1:
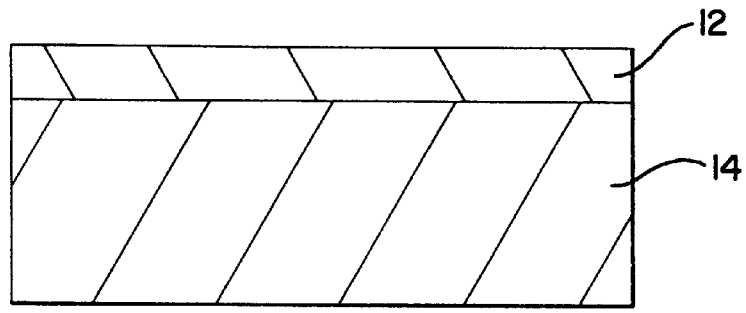
FIG. 1 shows a cross-sectional view of a two layered film structure of the present invention.

FIG. 1 shows a two layered film structure 10 having a skin layer 12 and a radio frequency ("RF") susceptible layer 14. The skin layer 12 confers heat distortion resistance and abrasion resistance and is preferably a polypropylene and more preferably a polypropylene copolymer blended with styrene and hydrocarbon block copolymers. More preferably, the skin layer 12 is a polypropylene copolymer blended with SEBS block copolymer within a range of 0–20% by weight. The skin layer 12 should have a thickness within the range of 0.2–3.0 mils thick.

The RF susceptible layer 14 of the present invention should have a dielectric loss of greater than 0.05 at frequencies within the range of 1–60 MHz within a temperature range of ambient to 250° C. The RF layer 14 preferably has four components. The RF layer 14 confers RF sealability, flexibility, heat distortion resistance, and compatibility to the film structure 10. The first component of the RF layer 14 is chosen from polypropylene copolymers and preferably the propylene alpha-olefin random copolymers ("PPE"). The PPE's possess the required rigidity and the resistance to yielding at the autoclave temperatures of about 121° C. However, by themselves, the PPE's are too rigid to meet the flexibility requirements. When combined by alloying with certain low modulus polymers, good flexibility can be achieved.

These low modulus copolymers can include ethylene based copolymers such as ethylene-co-vinyl acetate ("EVA"), ethylene co-alpha olefins, or the so-called ultra low density (typically less than 0.90 Kg/L) polyethylenes ("ULDPE"). These ULDPE include those commercially available products sold under the trademarks TAFMER® (Mitsui Petrochemical Co.) under the product designation A485, Exact® (Exxon Chemical Company) under the product designations 4023-4024, and Insite® technology polymers (Dow Chemical Co.). In addition, poly butene-l ("PB"), such as those sold by Shell Chemical Company under product designations PB-8010, PB-8310; thermoplastic elastomers based on SEBS block copolymers, (Shell Chemical Company), poly isobutene ("PIB") under the product designations Vistanex L-80, L-100, L-120, L-140 (Exxon Chemical Company), ethylene alkyl acrylate, the methyl acrylate copolymers ("EMA") such as those under the product designation EMAC 2707, and DS-1130 (Chevron), and n-butyl acrylates ("ENBA") (Quantum Chemical) were found to be acceptable copolymers. Ethylene copolymers such as the acrylic and methacrylic acid copolymers and their partially neutralized salts and ionomers, such as PRIMACOR® (Dow Chemical Company) and SURYLN® (E.I. DuPont de Nemours & Company) were also acceptable. Typically, ethylene based copolymers have melting point temperatures of less than about 110° C. are not suited for autoclaving at 121° C. applications. Furthermore, only a limited range of proportions of each component allows the simultaneous fulfillment of the flexibility and autoclavability requirements.

Preferably the first component is chosen from the group of polypropylene homo and random copolymers with alpha olefins which constitutes approximately 30–60%, more preferably 35–45%, and most preferably 45%, by weight of the film. For example, random copolymers of propylene and ethylene where the ethylene content is in an amount within the range of 0–6%, and more preferably within the range of 2–6%, of the weight of the propylene is preferred as the first component.

The second component of the RF layer 14 confers flexibility and low temperature ductility to the RF layer 14 and is chosen from the group consisting of polyolefins that do not have propylene repeating units ("non propylene based polyolefins") including ethylene copolymers including ULDPE, polybutene, butene ethylene copolymers, ethylene vinyl acetate, copolymers with vinyl acetate contents between approximately 18–50%, ethylene methyl acrylate copolymers with methyl acrylate contents being between approximately 20–40%, ethylene n-butyl acrylate copolymers with n-butyl acrylate content of between 20–40%, ethylene acrylic acid copolymers with the acrylic acid content of greater than approximately 15%. An example of these products are sold under such product designations as Tafmer A-4085 (Mitsui), EMAC DS-1130 (Chevron), Exact 4023, 4024 and 4028 (Exxon). Preferably, the second component is either ULDPE sold by Mitsui Petrochemical Company under the designation TAFMER A-4085, or polybutene-1, PB8010 and PB8310 (Shell Chemical Co.), and should constitute approximately 25–50%, more preferably 35–45%, and most preferably 45%, by weight of the film.

The first and second components of the RF layer 14 may be replaced by a single component selected from a high melting temperature and flexible olefins such as those polypropylenes sold by the Rexene Company under the product designation FPO. The melting point temperature of this component should be greater than 130° C. and the modulus less than 20,000 psi. This component should constitute between 30–60% by weight of the RF layer.

To impart RF dielectric loss to the RF layer 14, certain known high dielectric loss ingredients are included as the third component of the film structure 10. For example, EVA and EMA of sufficiently high co-monomer contents exhibit significant loss properties at 27 MHz to allow the compositions to be sealed by the dielectric process. Polyamides as a class of material, and ethylene vinyl alcohol ("EVOH") copolymers (typically produced by hydrolysing EVA copolymers), both possess high dielectric loss properties at suitable temperatures. Other active materials include PVC, vinylidine chlorides, and fluorides, copolymer of bisphenol-A and epichlorohydrines known as PHENOXYS® (Union Carbide). However, significant contents of these chlorine and fluorine containing polymers would make them environmentally unsound as incineration of such a material would generate inorganic acids. Therefore, the third component of the RF layer 14 is preferably chosen from the class of polyamides.

Preferably, the polyamides of the present invention will be chosen from aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amide containing copolymers (random, block or graft).

Polyamides such as nylons are widely used in film material because they offer abrasion resistance to the film. However, rarely are the nylons found in the layer which contacts medical solutions as they typically contaminate the solution by leaching out into the solution. However, it has been found by the applicants of the present invention that various dimer fatty acid polyamides sold by, for example, Henkel Corporation under the product designations MACROMELT and VERSAMID do not lead to such contamination and thus are the most preferred third component of the RF layer 14. The third component should constitute approximately 3–40%, more preferably between 7–13%, and most preferably 10%, by weight of the RF layer 14.

The fourth component of the RF layer 14 confers compatibility between the polar and nonpolar components of the RF layer 14. The fourth component was chosen from styrene-hydrocarbon block copolymers and preferably SEBS block copolymers that are modified by maleic anhydride, epoxy, or carboxylate functionalities. Most preferably the fourth component is an SEES block copolymer that is maleic anhydride functionalized. Such a product is sold by Shell Chemical Company under product designation KRATON RP-6509. The fourth component should constitute approximately 5–40%, more preferably 7–13%, and most preferably 10% by weight of the RF layer 14.

It may also be desirable to include a fifth component to the RF layer 14 of an SEES block copolymer, not modified by the above functional groups, such as the one sold by the Shell Chemical Company under the product designation KRATON G-1652. This component should constitute between 5–40% by weight of the RF Layer, more preferably between 7–13%, and most preferably 10%.

Preferably the RF susceptible layer will have a thickness within the range of 1–9 mils are more preferably 5.0 mils-8.0 mils, and most preferably 5.0 mils. The skin layer will have a thickness within the range of 0.2–3.0 mils and most preferably 0.5 mils.

Figure 2:
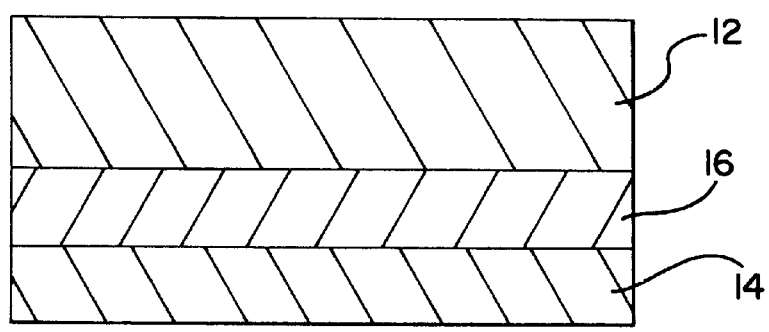
FIG. 2 shows a cross-sectional view of a three layered film structure of the present invention including a core layer added to the film of FIG. 1.

FIG. 2 shows another embodiment of the present invention having a core layer 16 interposed between the skin layer 12 and the RF layer 14. The core layer 16 confers heat distortion resistance, and flexibility to the film structure 10 and compatibility among the components of the film structure 10. Preferably, the core layer will have a thickness within the range of 0.5–10 mils and more preferably 1–4 mils. The core layer 16 includes three components. The first component is a polyolefin and preferably a polypropylene in an amount that constitutes in a range of 20–60% by weight of the core layer 16, more preferably 35–50%, and most preferably 45% of the core layer 16.

The second component of the core layer 16 is chosen from a group consisting of compounds that confer flexibility to the core layer 16 including ULDPE, polybutene copolymers. Preferably, the second component of the core layer is ULDPE or polybutene-1 in an amount by weight of 40%–60%, more preferably 40–50%, and most preferably 40%.

The third component of the core layer 16 is chosen from a group of compounds that confer compatibility among the components of the core layer 16 and includes styrene-hydrocarbon block copolymers and most preferably SEBS block copolymers. The third component is in an amount preferably within a range of 5–40% by weight of the core layer 16, more preferably 7–15%, and most preferably 15%.

It is also possible to add as a fourth component of the core layer 16, reground trim scrap material recovered during the manufacturing of containers. The scrap material is dispersed throughout the core layer 16. Scrap may be added in an amount preferably between approximately 0–50% by weight of the core layer 16, and more preferably within the range of 10–30% and most preferably within the range of 3–12%.

Figure 3:
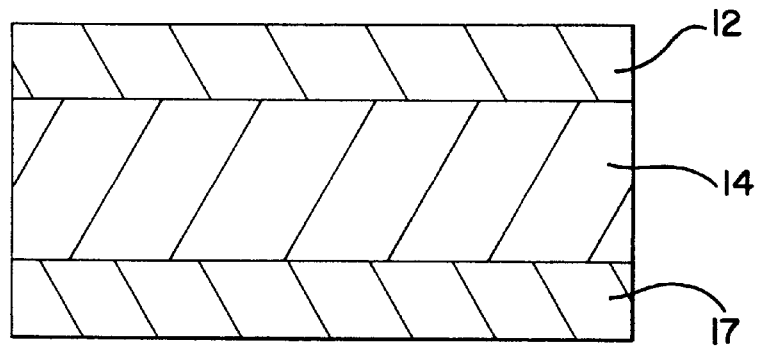
FIG. 3 shows a cross-sectional view of the film of FIG. 1 with a solution contact layer.

FIG. 3 shows the film or sheet structure of FIG. 1 including a solution contact layer 17 adhered to a side of the RF layer opposite the skin layer 12. The solution contact layer 17 includes three components that may be chosen from the same first three components and the same weight percentage ranges of the core layer 16 set forth above. Preferably, the solution contact layer 17 has a thickness within the range of 0.2–1.0 mils and most preferably 1.0 mils.

Figure 4:
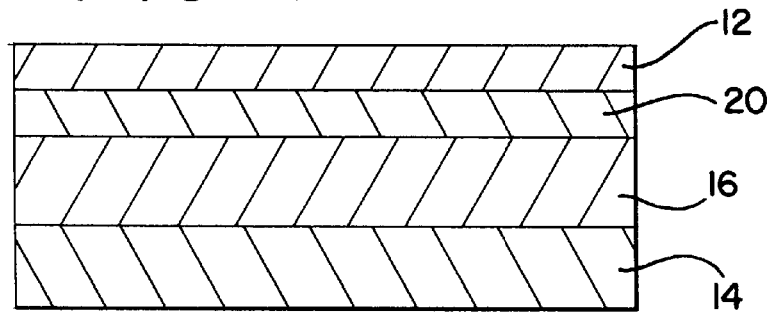
FIG. 4 shows a cross-sectional view of a four layered structure of the present invention having a discrete layer of scrap material between the skin and the core layers.
Figure 5:
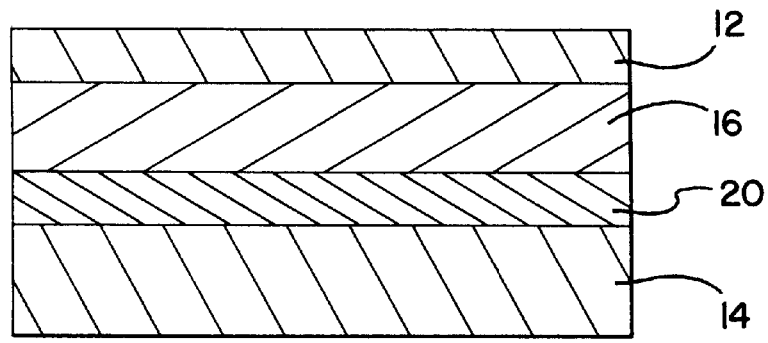
FIG. 5 shows a cross-sectional view of a film structure using reground scrap as a discrete layer between the core and the RF layers.
Figure 6:
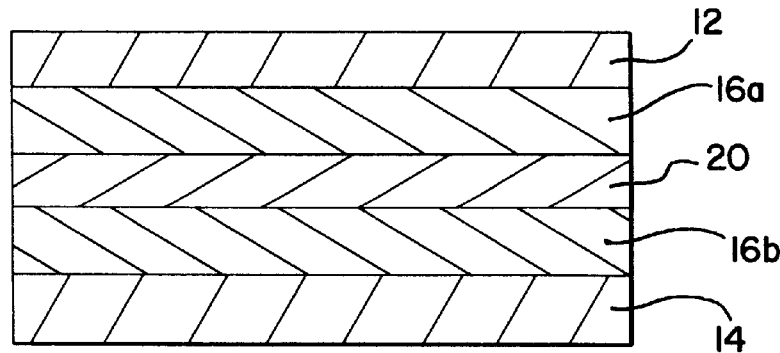
FIG. 6 shows a cross-sectional view of a film structure using reground scrap as a discrete layer which splits the core layer into two core layers.

FIG. 4 shows another embodiment of the multiple layer film structure having the skin layer 12, core layer 16, and RF layer 14 as described above with an additional discrete layer of scrap 20 between the skin layer 12 and the core layer 16. FIG. 5 shows the discrete scrap layer 20 between the core layer 16 and the RF layer 20. FIG. 6 shows the scrap layer 20 dividing the core layer 16 into first and second core layers 16a and 16b. Preferably, the layer of regrind should have a thickness within the range of 0.5–5.0 mils and most preferably 1.0 mils.

Figure 7:
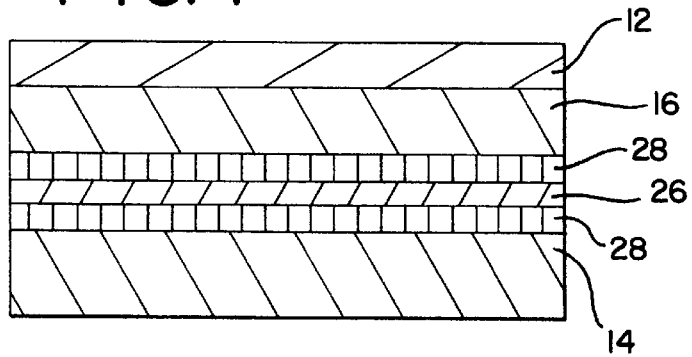
FIG. 7 shows a cross-sectional view of a film structure of the present invention having seven layers including a barrier layer between the core and the RF layers and two tie layers.
Figure 8:
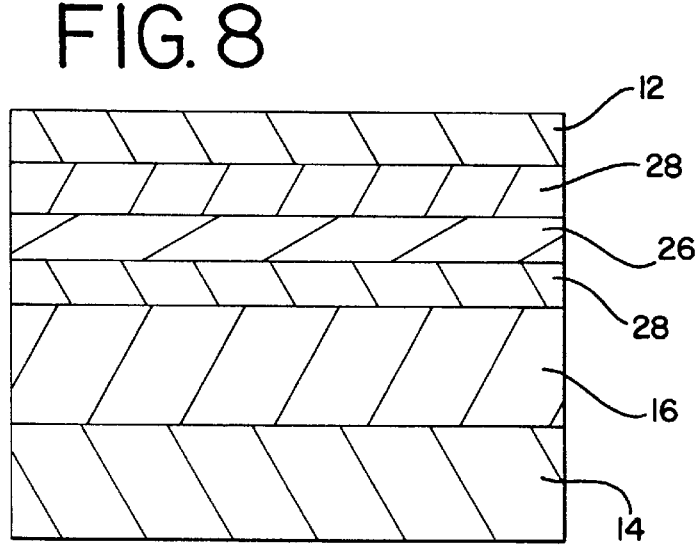
FIG. 8 shows the same structure of FIG. 6 except the barrier layer is disposed between the core layer and the skin layers.
Figure 9:
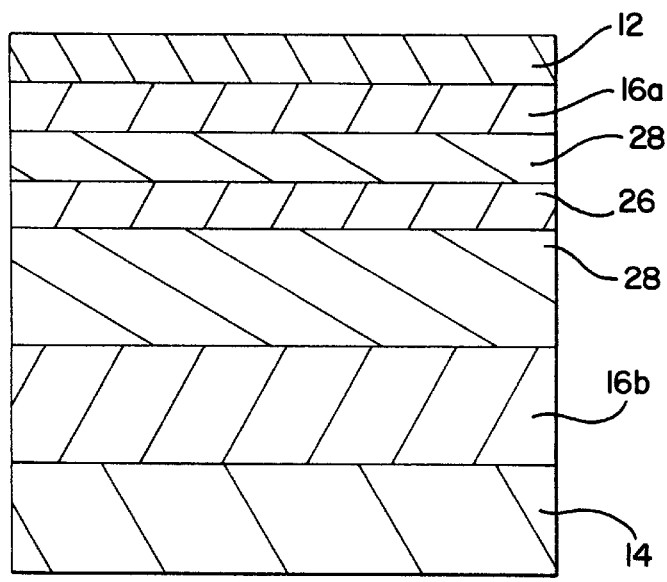
FIG. 9 shows a cross-sectional view of a film structure having a barrier layer dividing the core layers; and, FIG. 10 shows a container constructed from one of the film structures of the present invention.

FIG. 7 shows another embodiment of the present invention having seven layers including the skin 12, core 16, and RF layers 14 discussed above, with a barrier layer 26 interposed between the core 16 and RF layers 14 and adhered thereto with tie layers 28 attached to opposite sides of the barrier layer 26. FIG. 8 shows the barrier layer 26 between the core layer 16 and the skin layer 12. FIG. 9 shows the barrier layer 26 dividing the core layer 14 into two core layers 14a and 14b. The barrier layer 26 increases the gas barrier properties of the film structure 10. The barrier layer 26 is selected from the group consisting ethylene vinyl alcohols such as that sold under the name Evalca (Evalca Co.), highly glassy or crystalline polyamide such as Sclar PA® (Dupont Chemical Co.), high nitrile content acrylonitrile copolymers such as Barex® sold by British Petroleum. Preferably, the barrier layer 26 is ethylene vinyl alcohol, and has a thickness within the range of 0.3–1.5 mils and most preferably 1.0 mils.

The tie layers 28 may be selected from modified ethylene and propylene copolymers such as those sold under the product designations Prexar (Quantum Chemical Co.) and Bynel (Dupont) and should have a thickness within the range of 0.2–1.0 mils and most preferably 0.5 mil.

The above layers may be processed by coextrusion, coextrusion coating, or other acceptable process. It should be understood; however, that the method of manufacturing the film structure is not a part of the present invention, and thus the scope of this invention should not be limited to this extent.

Figure 10:
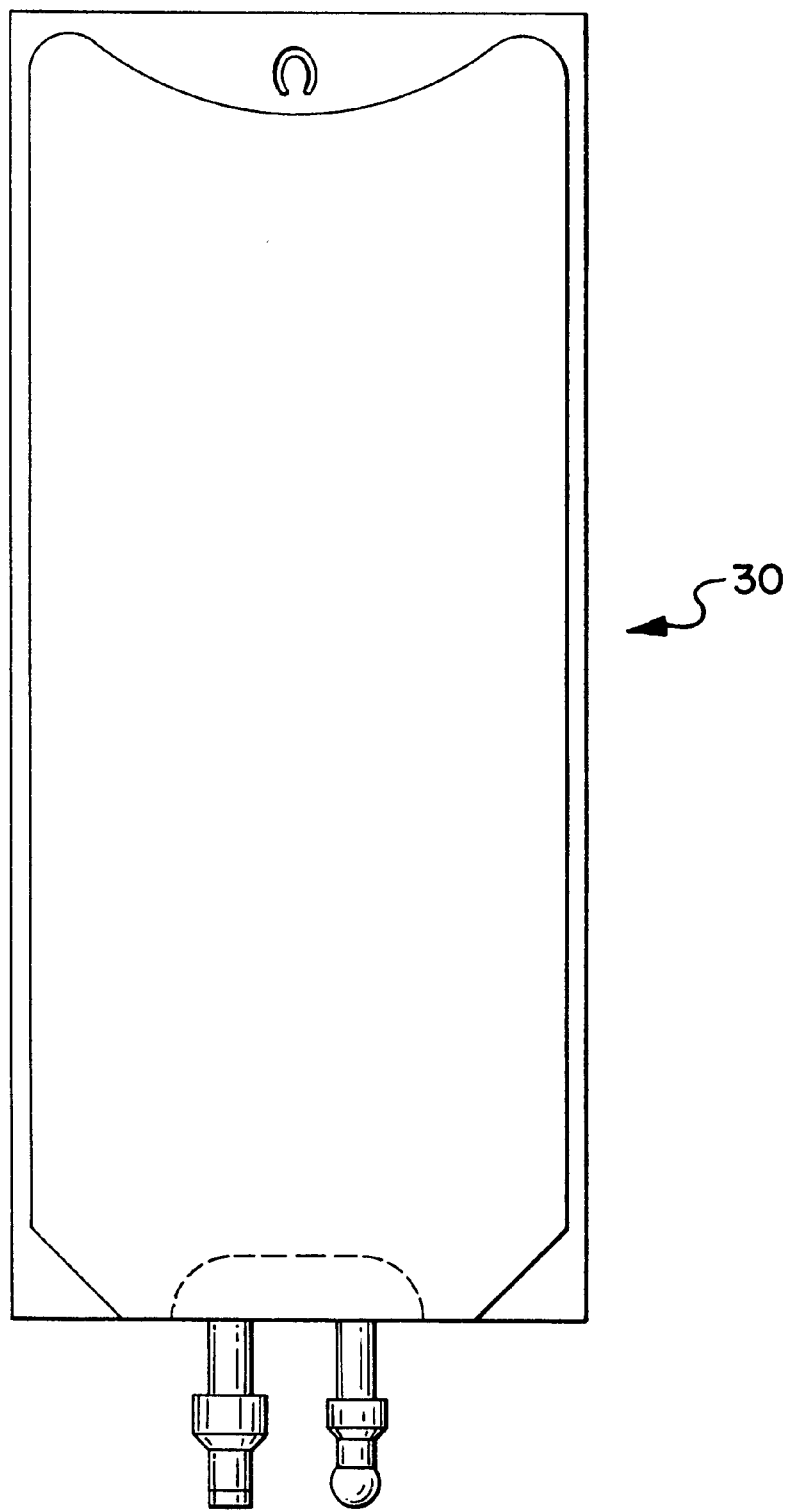

These materials may be used to manufacture I.V. therapy bags such as the one shown in FIG. 10 and generally designated as 30.

Films having various combinations of the above components and weight percentages as set forth in the examples below were tested using the following methods.

(1) AUTOCLAVABILITY:

Autoclave resistance is measured by sample creep, or the increase in the sample length, at 121° C. under 27 psi loading for one hour. The autoclave resistance must be less than or equal to 60%.

(2) LOW AND AMBIENT TEMPERATURE DUCTILITY:

(A) Low Temperature Ductility

In an instrumented impact tester fitted with a low temperature environmental chamber cooled with liquid nitrogen, film samples about 7 by 7 inches (18 cm by 18 cm) are mounted onto circular sample holders about 6 inches (15 cm) in diameter. A semi-spherical impact head with stress sensors is driven at high velocities (typically about 3 m/sec) into the preconditioned film loading it at the center. The stress-displacement curves are plotted, and the energy of impact is calculated by integration. The temperature at which the impact energy rises dramatically, and when the fractured specimen changes from brittle to ductile, high strain morphology is taken as a measure of the low temperature performance of the film ("L.Temp").

(B) Mechanical Modulus and Recovery:

The autoclaved film sample with a known geometry is mounted on a servohydraulically driven mechanical tester having cross heads to elongate the sample. At 10 inches (25 cm) per minute crosshead speed, the sample is elongated to about 20% elongation. At this point, the cross-heads travel and then reverse to travel in a direction opposite that originally used to stretch the sample. The stress strain behavior is recorded on a digital recorder. The elastic modulus ("E(Kpsi)") is taken from the initial slope on the stress-strain curve, and the recovery taken from the excess sample dimension as a percentage of sample elongation.

(3) RF PROCESSIBILITY:

Connected to a Callahan 27.12 MHz, 2 KW Radio Frequency generator, is a rectangular brass die of about 0.25 (6.3 mm) by 4 inches (10 cm) opposing to a flat brass electrode, also connected to the generator. Upon closing the die with two sheets of the candidate material in between with solution sides facing each other, RF power of different amplitudes and durations are applied. When the RF cycle is over, the die is opened and the resultant seal examined by manually pulling apart the two sheets. The strength of the seal (versus the film strength) and the mode of failure (peel, tear, or cohesive failures) are used to rate the RF responsiveness of the material.

Alternatively, the candidate film is first sputter coated with gold or palladium to a thickness of 100 angstroms to render the surface conductive, cut into a circular geometry and mounted between the parallel electrodes in a dielectric capacitance measuring cell. Using a Hewlett Packard 4092 automatic RF bridge, the dielectric constant and the dielectric losses are measured at different frequencies up to 10 MHz and temperatures up to 150° C. The dielectric loss allows the calculation of heat generation under an RF field.

From calculations or correlations with RF seal experiments the minimum dielectric loss for performance is obtained.

If the RF seal performance is obtained from the Callahan sealer, the following ranking scale is adopted:

| RF Power | RF Time | Seal Strength | Rating |
| --- | --- | --- | --- |
| 80% | 10 | No | 0 |
| 80% | 10 | Peelable | 1 |
| 80% | 05 | Peelable | 2 |
| 60% | 03 | Strong | 3 |
| 50% | 03 | Strong | 4 |
| 30% | 03 | Strong | 5 |

(4) OPTICAL CLARITY:

Post autoclaved film samples are first cut into about 2 by 2 inches (5 by 5 cms) squares, mounted on a Hunter Colorimeter and their internal haze measured according to ASTM D-1003. Typically, internal haze level of less than 30% is required, preferably less than 20% for these thicknesses ("Haze %").

(5) STRAIN WHITENING:

The autoclaved film is strained at moderate speeds of about 20 inches (50cm) per minute to about 100% elongation (twice the original length) and the presence of strain whitening (indicated by 1) or lack thereof (indicated by 0) is noted ("S.Whitening").

(6) ENVIRONMENTAL COMPATIBILITY:

The environmental compatibility comprises three important properties: (a) the material is free of low molecular weight plasticizers which could leach into landfills upon disposal, (2) the material can be thermoplastically recycled into useful items upon fulfilling the primary purpose of medical delivery, and (3) when disposed of by energy reclaim by incineration, no significant inorganic acids are released to harm the environment. ("Envir."). The composition will also contain less than 0.1% halogens by weight. In order to facilitate recycling by melt processing, the resultant composition should have a loss tangent greater than 1.0 at 1 Hz measured at processing temperatures.

(7) SOLUTION COMPATIBILITY

By solution compatibility we mean that a solution contained within the film is not contaminated by components which constitute the composition. ("S.Comp.") The low molecular weight water soluble fraction of the composition will be less than 0.1%.

The following combinations were tested using the above test for the films set forth below.

| Reference Number | Layer Type | Layer Composition | Modulus (psi) | Strain Recovery E (kpsi) | % Haze | Environmental | Autoclav. | Dielectric Loss | Low Temperature | S. Comp. |
| --- | --- | --- | --- | --- | --- | --- | --- | --- | --- | --- |
| FIG. 1 | Skin | 0.5 mil - 100% Amoco PP Copolymer 8410 | 25 | 75 | 10 | Yes | Yes | 3 | −35° C. | Yes |
|  | RF | 8.0 mils - 40% Solvay Fortiline ™ PP Copolymer 4208 |  |  |  |  |  |  |  |  |

-continued

| Reference Number | Layer Type | Layer Composition | Modulus (psi) | Strain Recovery E (kpsi) | % Haze | Environ-mental | Autoclav. | Dielectric Loss | Low Temp-erature | S. Comp. |
|---|---|---|---|---|---|---|---|---|---|---|
| FIG. 2 | Skin | 0.5 mil - 100% Amoco PP Copolymer 8410 | 25 | 75 | 12 | Yes | Yes | 4 | −40° C. | Yes |
| | Core | 4.0 mils - 45% Solvay Fortiline ™ PP Copolymer 4208<br>40% Mitsui Tafmer ™ ULDPE<br>15% Shell Kraton ™ G1657 | | | | | | | | |
| | RF | 5.0 mils - 40% Solvay Fortiline 198 PP Copolymer 4208<br>40% Mitsui Tafmer ™ ULDPE<br>10% Shell Kraton ™ RP-6509<br>10% Henkel Macromelt ™ 6301 | | | | | | | | |
| FIG. 3 | Skin | 0.5 mil - 100% Amoco PP Copolymer 8410 | 25 | 70 | 15 | Yes | Yes | 2 | −35° C. | Yes |
| | RF | 8.0 mils - 40% Solvay Fortiline ™ PP Copolymer 4208<br>40% Mitsui Tafmer ™ ULDPE<br>10% Shell Kraton ™ EP-6509<br>10% Henkel Macromelt ™ 6301 | | | | | | | | |
| | Solution Contact Skin | 1.0 mils - 45% Solvay Fortiline ™ PP Copolymer 4208<br>40% Mitsui Tafmer ™ ULDPE<br>15% Shell Kraton ™ G1657 | | | | | | | | |
| FIG. 4 | Skin | 0.5 mil - 100% Amoco PP Copolymer 8410 | 25 | 75 | 16 | Yes | Yes | 4 | −35° C. | Yes |
| | Regrind | 1.0 mil - 100% Regrind | | | | | | | | |
| | Core | 3.0 mils - 45% Solvay Fortiline ™ PP Copolymer 4208<br>40% Mitsui Tafmer ™ ULDPE<br>15% Shell Kraton ™ G1657 | | | | | | | | |
| | RF | 5.0 mils - 40% Solvay Fortiline ™ PP Copolymer 4208<br>40% Mitsui Tafmer ™ ULDPE<br>10% Shell Kraton ™ RP6509<br>10% Henkel Macromelt ™ 6301 | | | | | | | | |
| FIG. 5 | Skin | 0.5 mil - 100% Amoco PP Copolymer 8410 | 25 | 75 | 16 | Yes | Yes | 4 | 35° C. | Yes |
| | Core | 3.0 mils - 45% Solvay Fortiline ™ PP Copolymer 4208<br>40% Mitsui Tafmer ™ ULDPE<br>15% Shell Kraton ™ G1657 | | | | | | | | |
| | Regrind | 1.0 mil - 100% Regrind | | | | | | | | |
| | RF | 5.0 mils - 40% Solvay Fortiline ™ PP Copolymer 4208<br>40% Mitsui Tafmer ™ ULDPE<br>10% Shell Kraton ™ RP6509 | | | | | | | | |
| FIG. 7 | Skin | 0.5 mil - 100% Amoco PP Copolymer 8410 | 30 | 20 | 20 | Yes | Yes | 4 | −20° C. | Yes |
| | Core | 2.0 mils - 45% Solvay Fortiline ™ PP Copolymer 4208<br>40% Mitsui Tafmer ™ ULDPE<br>15% Shell Kraton ™ G 1657 | | | | | | | | |
| | Tie | 0.5 mil 100% Bynel | | | | | | | | |
| | Barrier | 1.0 mil 100% EVOH | | | | | | | | |
| | Tie | 0.5 mil 100% Bynel | | | | | | | | |
| | RF | 5.0 mils 40% Solvay Fortiline ™ PP Copolymer 4208<br>40% Mitsui Tafmer ™ ULDPE<br>10% Shell Kraton ™ RP6509<br>10% Henkel Macromelt ™ 6301 | | | | | | | | |
| FIG. 8 | Skin | 0.5 mil 100% Amoco PP Copolymer 8410 | 30 | 70 | 20 | Yes | Yes | 3 | −20° C. | Yes |
| | Tie | 0.5 mil 100% Bynel | | | | | | | | |
| | Barrier | 1.0 mil 100% EVOH | | | | | | | | |
| | Tie | 0.5 mil 100% Bynel | | | | | | | | |
| | Core | 2.0 mils - 45% Solvay Fortiline ™ PP Copolymer 4208<br>40% Mitsui Tafmer ™ ULDPE<br>15% Shell Kraton ™ G 1657 | | | | | | | | |
| | RF | 5.0 mils 40% Sovlay Fortiline ™ PP Copolymer 4208<br>40% Mitsui Trafmer ™ ULDPE<br>10% Shell Kraton ™ RP6509 | | | | | | | | |

-continued

| Reference Number | Layer Type | Layer Composition | Modulus (psi) | Strain Recovery E (kpsi) | % Haze | Environmental | Autoclav. | Dielectric Loss | Low Temperature | S. Comp. |
|---|---|---|---|---|---|---|---|---|---|---|
| FIG. 9 | Skin | 10% Henkel Macromelt ™ 6301<br>0.5 mil - 100% Amoco PP Copolymer 8410 | 30 | 70 | 20 | Yes | Yes | 3 | −20° C. | Yes |
|  | Core | 1.0 mils - 45% Solvay Fortiline ™ PP Copolymer 4208<br>40% Mitsu Tafmer ™ ULDPE<br>15% Shell Kraton ™ G 1657 |  |  |  |  |  |  |  |  |
|  | Tie | 0.5 mil 100% Bynel |  |  |  |  |  |  |  |  |
|  | Barrier | 1.0 mil 100% EVOH |  |  |  |  |  |  |  |  |
|  | Tie | 0.5 mil 100% Bynel |  |  |  |  |  |  |  |  |
|  | Core | 1.0 mils - 45% Solvay Fortiline ™ PP Copolymer 4208<br>40% Mitsu Tafmer ™ ULDPE<br>15% Shell Kraton ™ G 1657 |  |  |  |  |  |  |  |  |
|  | RF | 5.0 mils 40% Solvay Fortiline ™ PP Copolymer 4208<br>40% Mitsui Tafmer ™ ULDPE<br>10% Shell Kraton ™ RP6509<br>10% Henkel Macromelt ™ 6301 |  |  |  |  |  |  |  |  |

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A multiple layer thermoplastic structure suitable for manufacturing medical products comprising:
   (1) a skin layer being selected from a group consisting of a polypropylene and polypropylene copolymers;
   (2) a radio frequency susceptible layer comprising:
      (a) a propylene-containing polymer,
      (b) at polyolefin selected from the group consisting of ethylene copolymers, ultra-low density polyethylene, polybutene, butene ethylene copolymers;
      (c) a radio frequency susceptible polymer selected from the group consisting of polyamides, ethylene vinyl acetate with a vinyl acetate content in an amount from 18–50% by weight, ethylene methyl acrylate copolymers with methyl acrylate comonomer contents from 20%–40% by weight, ethylene vinyl alcohol with vinyl alcohol in an amount from 15%–70% mole percent,
      (d) a compatibilizing agent of a styrene and hydrocarbon block copolymer; and
      (e) wherein the radio frequency susceptible layer having a dielectric loss greater than 0.05 at 1–60 MHz and at temperatures of ambient to 250° C.;
   (3) a barrier layer positioned between the skin layer and the radio frequency susceptible layer; and
   wherein the multiple layer structure has a mechanical modulus of less than 40,000 psi when measured according to ASTM D-882.

2. The structure of claim 1 wherein the polyolefin is ultra low density polyethylene or polybutene-1, the radio frequency susceptible polymer is a polyamide, the compatibilizing agent is a styrene-ethylene-butene-styrene block copolymer, and wherein the barrier layer includes an ethylene vinyl alcohol or a polyamide.

3. The structure of claim 2 further including a tie layers on opposite sides of the barrier layer.

4. The structure of claim 3 wherein the tie layers comprise modified ethylene and propylene copolymers.

5. The structure of claim 1 wherein the propylene-containing polymer is in amount from 30–60% by weight of the susceptible layer.

6. The structure of claim 5 wherein the polyolefin is in an amount from 25–50% by weight of the susceptible layer.

7. The structure of claim 6 wherein the susceptible polymer is in an amount from 3–40% by weight of the susceptible layer.

8. The structure of claim 7 wherein the compatiblizing polymer is in an amount from 5–40% by weight of the susceptible layer.

* * * * *